J. BLANCHARD.
Plows.
No. 144,433. Patented Nov. 11, 1873.
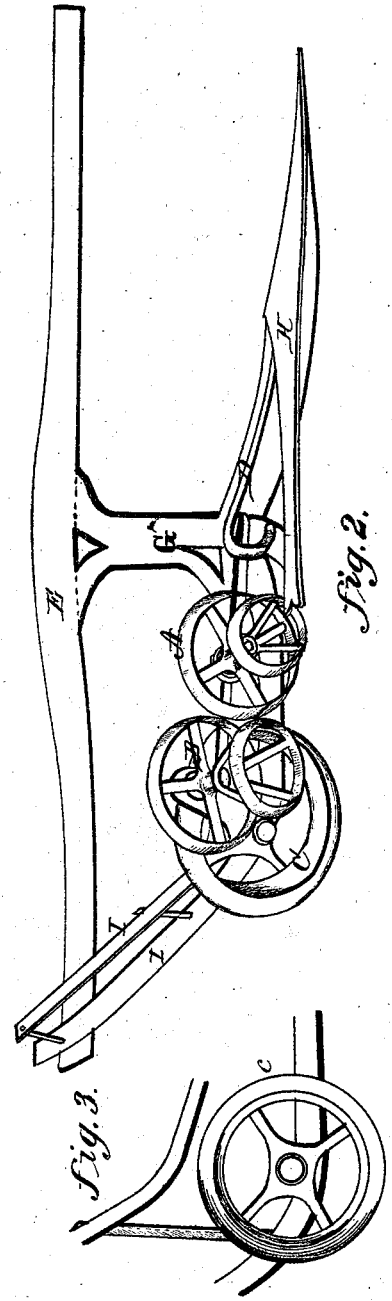
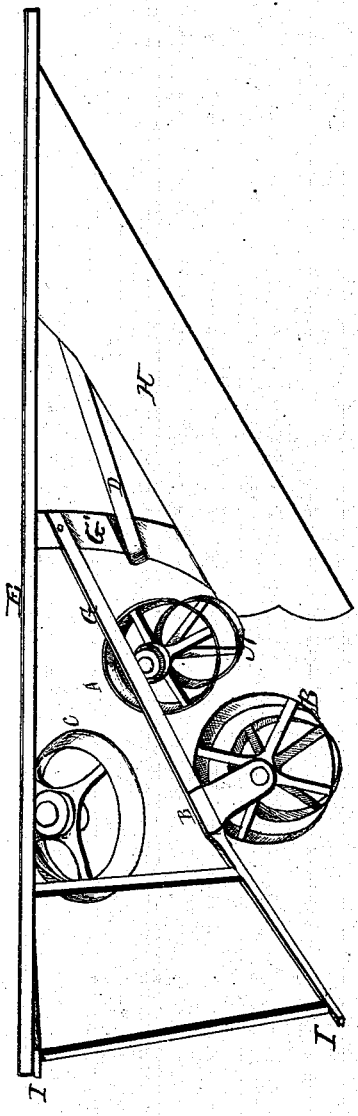
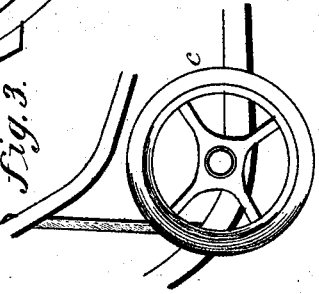
Witnesses
John A. Ellis
F. L. Ourand
Inventor
Jerome Blanchard
per
J. H. Alexander & Co.
Att'ys

UNITED STATES PATENT OFFICE.

JEROME BLANCHARD, OF EAST SAGINAW, MICHIGAN, ASSIGNOR OF ONE-HALF HIS RIGHT TO H. WALLACE CARTER, OF SAME PLACE.

IMPROVEMENT IN PLOWS.

Specification forming part of Letters Patent No. 144,433, dated November 11, 1873; application filed April 5, 1873.

*To all whom it may concern:*

Be it known that I, JEROME BLANCHARD, of East Saginaw, in the county of Saginaw and State of Michigan, have invented certain new and useful Improvements in Plows; and I do hereby declare that the following is a full, clear, and exact description thereof, reference being had to the accompanying drawings and to the letters of reference marked thereon, which form a part of this specification.

The nature of my invention consists in the combination and arrangement, with a plow, of certain wheels and a bar, as hereinafter more fully set forth, to take the place of the ordinary mold-board and land-side of the plow.

In order to enable others skilled in the art to which my invention appertains to make and use the same, I will now proceed to describe its construction and operation, referring to the annexed drawing, in which—

Figure 1 is a side view, and Fig. 2 a plan view, of a plow embodying my invention. Fig. 3 shows, detached, the wheel used in lieu of the land-side.

E represents a plow-beam, connected, by means of a suitable skeleton-frame, G G', with the plowshare H and handles I I.

These parts may be constructed and arranged in any desired manner, as I lay no claim to the same.

C represents a wheel, which is provided with a double bevel edge, and is mounted on a stud on the frame G. This wheel stands at an angle of about forty-five degrees with the plow-level, and does away with the old style of land-side to a plow. This wheel C thus obviates the necessity of the use and friction of a straight bar, enabling the plow to move easily over ground of unequal surface, and with less friction over level surfaces than by the usual method. A and B represent two sets of wheels, arranged in rear of the plowshare, taking place of the mold-board. These wheels have each a double rim, as shown, and stand at an angle with the plow-level, and a bar, D, extends from the plowshare to near the front wheel A.

The wheels A and B, arranged in rear of the plowshare, enable the plow to move with less friction than by the old method, and enable the sod to be laid more easily. The bar D carries the sod to and raises it on the front wheel.

Having thus fully described my invention, what I claim as new, and desire to secure by Letters Patent, is—

The two sets of skeleton-wheels A B, forming the entire mold-board, and used in connection with the bar D, all constructed and arranged as shown, and for the purpose specified.

In testimony that I claim the foregoing as my own, I affix my signature in presence of two witnesses.

JEROME BLANCHARD.

Witnesses:
C. H. GAGE,
MORGAN L. GAGE.